(12) United States Patent
Parikh (10) Patent No.: US 9,161,312 B2
(45) Date of Patent: Oct. 13, 2015

(54) POWER MODE CONTROL FOR A COMMUNICATION DEVICE

(75) Inventor: Ajay S. Parikh, North Potomac, MD (US)

(73) Assignee: ATC Technologies, LLC, Reston, VA (US)

(*) Notice: Subject to any disclaimer, the term of this patent is extended or adjusted under 35 U.S.C. 154(b) by 2738 days.

(21) Appl. No.: 11/490,166

(22) Filed: Jul. 21, 2006

(65) Prior Publication Data

US 2007/0021062 A1 Jan. 25, 2007

Related U.S. Application Data

(60) Provisional application No. 60/701,521, filed on Jul. 22, 2005.

(51) Int. Cl.
*H04B 7/185* (2006.01)
*H04W 52/02* (2009.01)
*H04H 20/74* (2008.01)

(52) U.S. Cl.
CPC ......... *H04W 52/028* (2013.01); *H04B 7/18563* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 5,854,784 A * | 12/1998 | Solve et al. | | 370/311 |
| 6,085,090 A * | 7/2000 | Yee et al. | | 455/440 |
| 6,088,589 A * | 7/2000 | Valentine et al. | | 455/433 |
| 6,141,688 A * | 10/2000 | Bi et al. | | 709/227 |
| 6,163,677 A * | 12/2000 | Natsukawa et al. | | 455/11.1 |
| 6,163,679 A * | 12/2000 | Bakke et al. | | 455/12.1 |
| 6,487,264 B1 * | 11/2002 | Alley et al. | | 375/361 |
| 6,490,458 B1 * | 12/2002 | Campbell | | 455/463 |
| 6,529,707 B1 * | 3/2003 | Dent | | 455/13.1 |
| 6,690,947 B1 * | 2/2004 | Tom | | 455/556.1 |
| 6,763,226 B1 * | 7/2004 | McZeal, Jr. | | 455/90.2 |
| 2002/0016151 A1 * | 2/2002 | Romans | | 455/13.4 |
| 2002/0119796 A1 * | 8/2002 | Vanghi | | 455/522 |
| 2003/0032463 A1 * | 2/2003 | Cannon et al. | | 455/574 |
| 2005/0147049 A1 * | 7/2005 | Ganesan | | 370/241 |
| 2005/0262367 A1 * | 11/2005 | Shih | | 713/323 |

FOREIGN PATENT DOCUMENTS

| | | | |
|---|---|---|---|
| EP | 1 059 826 | 12/2000 | |
| EP | 1059826 A1 * | 12/2000 | ............... H04Q 7/38 |

(Continued)

OTHER PUBLICATIONS

Partial International Search Report, Feb. 2, 2007, 3 pages.

(Continued)

*Primary Examiner* — Ayodeji Ayotunde
(74) *Attorney, Agent, or Firm* — Snyder, Clark, Lesch & Chung, LLP (57) ABSTRACT

A communication device may include a power source, a transmitter configured to transmit radio frequency signals to a satellite via a satellite-based network and a receiver configured to receive radio frequency signals from the satellite via the satellite-based network. The communication device may also include logic configured to receive power mode control information from a handset coupled to the communication device. The logic may also be configured to provide power to components of the communication device from the power source based on the power mode control information.

25 Claims, 7 Drawing Sheets

(56) References Cited

FOREIGN PATENT DOCUMENTS

| WO | 96/10896 | 4/1996 |
| WO | 98/28931 | 7/1998 |
| WO | WO 98/29967 | 7/1998 |
| WO | WO2004/112418 | 12/2004 |
| WO | WO 2004/112418 A1 * | 12/2004 | ............... H04Q 7/38 |

OTHER PUBLICATIONS

PCT/US2006/028136 International Search Report with Written Opinion, May 25, 2007, 18 pages.

* cited by examiner

POWER MODE CONTROL FOR A COMMUNICATION DEVICE

RELATED APPLICATION

This application claims priority under 35 U.S.C. §119 based on U.S. Provisional Application No. 60/701,521, filed Jul. 22, 2005, the disclosure of which is hereby incorporated herein by reference.

FIELD OF THE INVENTION

This invention relates generally to wireless communications and, more particularly, to powering components involved in wireless communications.

BACKGROUND

Mobile telephones have become increasingly common in every day life. For example, people often use their mobile telephones at work, at home and on travel. As people travel, however, conventional cellular service may not be available. For example, as a user moves out of a particular service area, the user may be unable to transmit and receive calls.

In other situations, conventional cellular service may not be available at various times due to one or more problems in a terrestrial cellular network. For example, one or more cell towers associated with transmitting and receiving calls may be out of service for any number of reasons. In still other situations, a high volume of calls may make it impossible for a user to make or receive a call. As a result, conventional cellular networks may not provide adequate service for a user in various situations.

SUMMARY

According to one aspect, a method for powering a device that communicates with a satellite is provided. The method includes operating the device in a first power mode when a handset coupled to the device is turned on, where the first power mode represents a standby mode in which the device is configured to receive signals from the satellite. The method also includes operating the device in a second power mode when the handset is in a transmission mode associated with transmitting signals to the satellite, where the second power mode represents a full power mode. The method further includes maintaining the device in the first power mode when the transmission mode is terminated.

According to another aspect, a system is provided. The system includes a first device configured to transmit and receive radio frequency signals via a terrestrial-based network. The system also includes a second device configured to transmit and receive radio frequency signals via a satellite-based network. The second device is configured to receive power mode control information from the first device. The second device is also configured to provide power to components of the second device from a power source located within the second device based on the power mode control information.

According to still another aspect, a communication device is provided. The communication device includes a power source, a transmitter, a receiver and logic. The transmitter is configured to transmit radio frequency signals to a satellite via a satellite-based network and the receiver is configured to receive radio frequency signals from the satellite via the satellite-based network. The logic is configured to receive power mode control information from a handset coupled to the communication device. The logic is also configured to provide power to components of the communication device from the power source based on the power mode control information.

BRIEF DESCRIPTION OF THE DRAWINGS

Reference is made to the attached drawings, wherein elements having the same identifier/name may represent like elements throughout.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods described herein provide a mobile communication device that operates in conjunction with a terrestrial network and a satellite-based network. In one implementation, a handset of the mobile communication device may be coupled to a satellite companion unit (SCU) that facilitates communication with the satellite-based network. The power mode operation of the SCU may be controlled via the handset to conserve power used by the SCU and enhance the battery life of the SCU.

Exemplary Network

Figure 1:
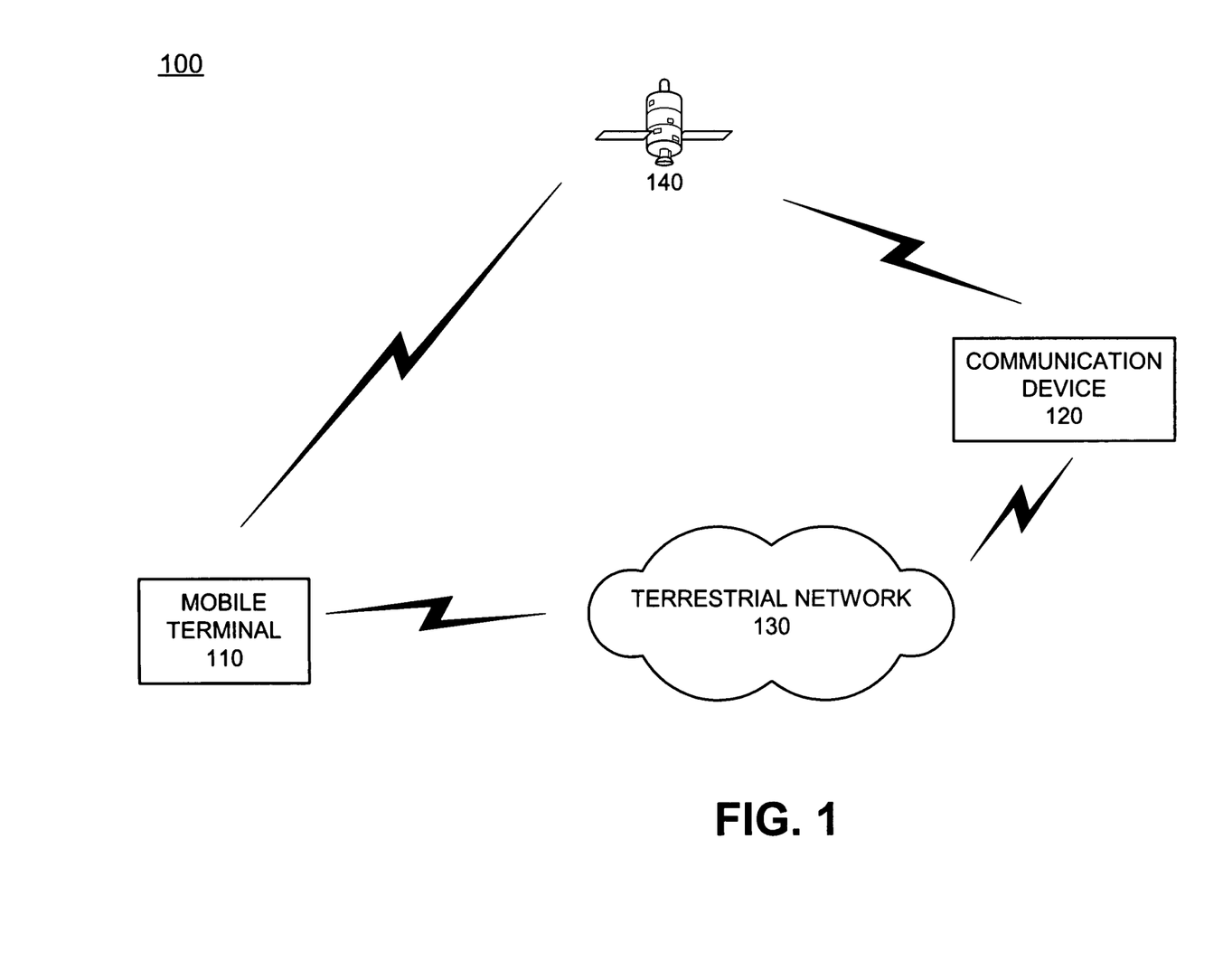
FIG. 1 illustrates an exemplary network in which methods and systems described herein may be implemented.

FIG. 1 is a diagram of an exemplary network 100 in which methods and systems described herein may be implemented. Referring to FIG. 1, network 100 may include mobile terminal 110, communication device 120, terrestrial network 130 and satellite 140. The number of devices shown in network 100 is provided for simplicity. It should be understood that network 100 may include additional devices that aid in the transmission and reception of information, as well as additional mobile terminals and communication devices.

Mobile terminal 110 may include components for transmitting and receiving radio frequency (RF) signals via terrestrial network 130 and satellite 140. In an exemplary implementation, mobile terminal 110 may include a cellular radiotelephone, a Personal Communications System (PCS) terminal that may combine a cellular radiotelephone with other data processing/communications capabilities; a personal digital assistant (PDA), a conventional laptop and/or palmtop receiver or other appliance that includes a radiotelephone transceiver. In an exemplary implementation, mobile terminal 110 may be configured to communicate with other devices/systems, such as communication device 120, via terrestrial network 130 and/or via satellite 140. In an exemplary implementation, mobile terminal 110 may communicate with terrestrial network 130 using, for example, the L-band, the S-band, or another RF band.

Communication device 120 may include any type of device that is capable of transmitting and receiving voice signals and/or data signals to/from a network. For example, communication device 120 may include any conventional telephone that interfaces with, for example, the public switched telephone network (PSTN) or a wireless network to place and receive telephone calls. Communication device 120 may be a standard PSTN-based telephone, a cordless telephone, a cellular telephone, a PDA, a mobile device similar to mobile terminal 110 or another type of conventional telephone.

Communication device 120 may also include any client, such as a computer device, web-based appliance, etc., that is configured to provide telephone functions. For example, communication device 120 may be a session initiation protocol (SIP)-based telephone.

Terrestrial network 130 may include one or more wired and/or wireless networks that are capable of receiving and transmitting data and voice signals. For example, terrestrial network 130 may include one or more PSTNs or other type of switched network. Terrestrial network 130 may also include packet switched networks, such as the Internet, an intranet, a wide area network (WAN), a metropolitan area network (MAN) or another type of network capable of transmitting data from a source device to a destination device.

Terrestrial network 130 may also include one or more earth-based cellular networks that include components for transmitting and receiving data and voice signals using RF communications. Such components may include base station antennas and transmission towers (not shown) that transmit and receive data from mobile terminals within their vicinity. Such components may also include base stations (not shown) that connect to the base station antennas and communicate with other devices, such as switches and routers (not shown) in accordance with known techniques.

Satellite 140 may represent one of more spaced-based components that are included in a satellite-based network. Satellite 140 may communicate with mobile terminal 110 and other devices in system 100, such as various gateways, routers, etc., that interface with other networks, such as terrestrial network 130. Satellite 140 may communicate with mobile terminal 110 using, for example, the L-band, the S-band, or another RF band.

Figure 2:
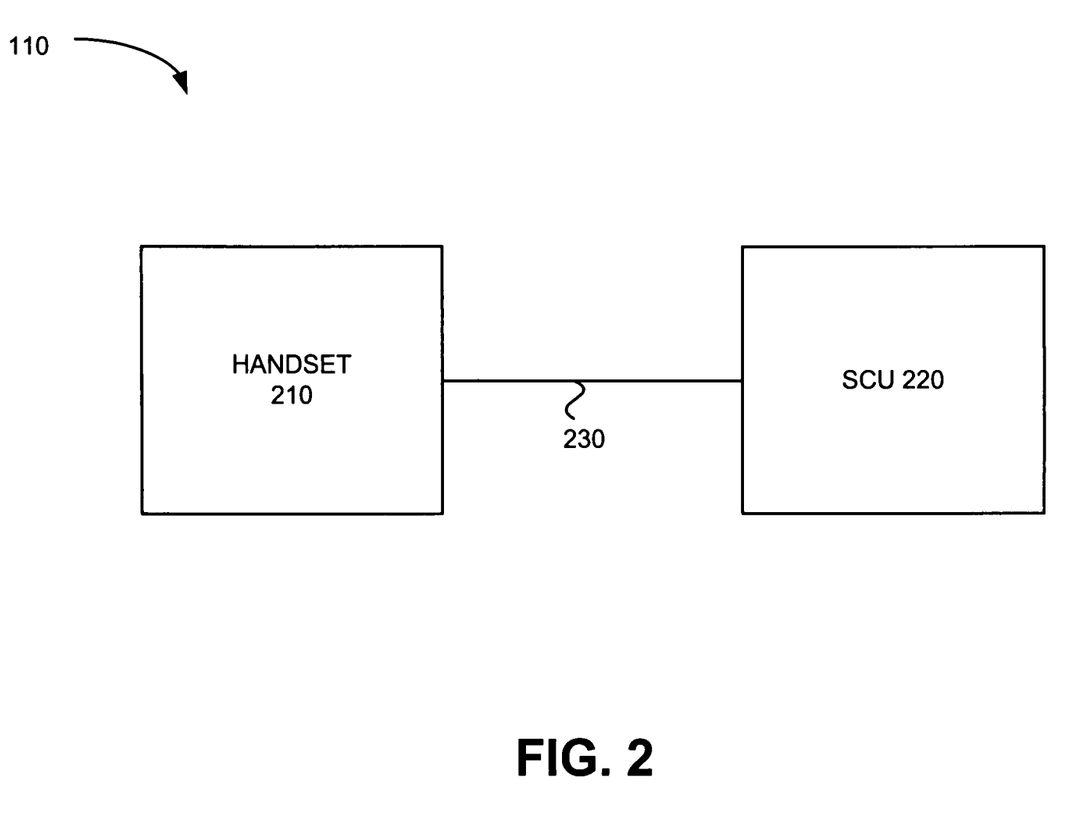
FIG. 2 is an exemplary diagram of the mobile terminal of FIG. 1.

Mobile terminal 110, as discussed above, may include components for communicating via terrestrial network 130 and satellite 140. In one exemplary implementation, mobile terminal 110 may include a handset 210 and a satellite companion unit (SCU) 220, as illustrated in FIG. 2. The term "handset" as used herein may include a radiotelephone device that includes one or more antennas, transmitters and receivers for communicating with a terrestrial network, such as terrestrial network 130. Referring to FIG. 2, handset 210 may be coupled to SCU 220 via connection 230, also referred to herein as cable 230. In an exemplary implementation, connection 230 may be a wired connection, such as a coaxial cable, a twisted pair connection, etc. In these implementations, handset 210 and SCU 220 may include connectors that facilitate easy connecting and/or disconnecting of cable 230 to handset 210 and/or SCU 220. In some implementations, the connection from SCU 220 to cable 230 may be a permanent or semi-permanent type connection to help ensure that cable 230 does not get lost.

In other implementations, handset 210 and SCU 220 may be integrally formed and connection 230 may represent an internal bus/conductor connecting various components associated with handset 210 and SCU 220. In still other implementations, handset 210 may communicate with SCU 220 using wireless communications.

Figure 3:
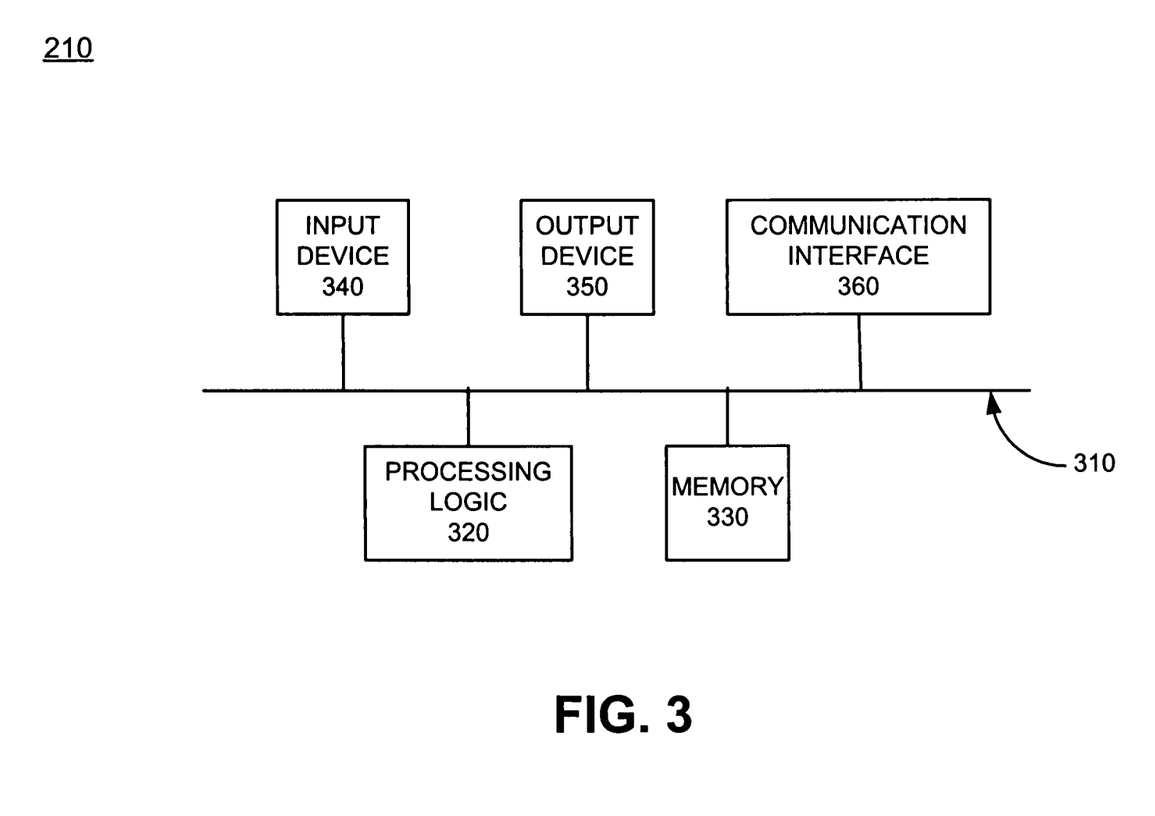
FIG. 3 is an exemplary diagram of the handset illustrated in FIG. 2.

FIG. 3 is a block diagram illustrating an exemplary configuration of handset 210. Handset 210 may include bus 310, processing logic 320, memory 330, input device 340, output device 350 and communication interface 360. Bus 310 permits communication among the components of handset 210. One skilled in the art would recognize that handset 210 may be configured in a number of other ways and may include other or different elements. For example, handset 210 may include one or more power supplies (not shown). Handset 210 may also include a modulator, a demodulator, an encoder, a decoder, etc., for processing data.

Processing logic 320 may include a processor, microprocessor, an application specific integrated circuit (ASIC), field programmable gate array (FPGA) or the like. Processing logic 320 may, in some implementations, execute software instructions/programs or data structures to control operation of mobile terminal 110.

Memory 330 may include a random access memory (RAM) or another type of dynamic storage device that stores information and instructions for execution by processing logic 320; a read only memory (ROM) or another type of static storage device that stores static information and instructions for use by processing logic 320; a flash memory (e.g., an electrically erasable programmable read only memory (EEPROM)) device for storing information and instructions; and/or some other type of magnetic or optical recording medium and its corresponding drive. Memory 330 may also be used to store temporary variables or other intermediate information during execution of instructions by processing logic 320. Instructions used by processing logic 320 may also, or alternatively, be stored in another type of computer-readable medium accessible by processing logic 320

Input device 340 may include one or more mechanisms that permits an operator to input information to handset 210. For example, input device may include a microphone, a keyboard, a keypad, a mouse, a pen, voice recognition and/or biometric mechanisms, etc. Input device 340 may be used to facilitate placing telephone calls to other devices, carrying on a conversation, etc.

Output device 350 may include one or more mechanisms that output information to the user, including a display, one or more speakers, a printer, etc. Output device 350 may be used to facilitate receiving telephone calls from other devices, carrying on a conversation, etc.

Communication interface 360 may include any transceiver-like mechanism that enables handset 210 to communicate with other devices and/or systems. For example, communication interface 360 may include an interface, such as an RF connector (e.g., a coaxial connector), to cable 230 or another device. Communication interface 360 may also include other mechanisms for communicating via a network, such as a wireless network. For example, communication interface 360 may include one or more RF transmitters and receivers and/or transceivers, one or more antennas, etc., used to transmit and receive RF signals, such as RF signals transmitted/received via terrestrial network 130. In one implementation, handset 210 may include one or more antennas, transmitters and receivers that enable handset 210 to communicate with terrestrial network 130 using, for example, L band, S band or another RF band.

Mobile terminal 110 may perform processing associated with communicating via terrestrial network 130 and/or satellite 140, as described in detail below. Mobile terminal 110 may perform these operations in response to processing logic 320 executing sequences of instructions contained in a computer-readable medium, such as memory 330. Such instructions may be read into memory 330 from another computer-readable medium via, for example, communication interface 360. A computer-readable medium may include one or more memory devices and/or carrier waves. In alternative embodiments, hard-wired circuitry may be used in place of or in combination with software instructions to implement processes consistent with the invention. Thus, implementations consistent with the invention are not limited to any specific combination of hardware circuitry and software.

Figure 4:
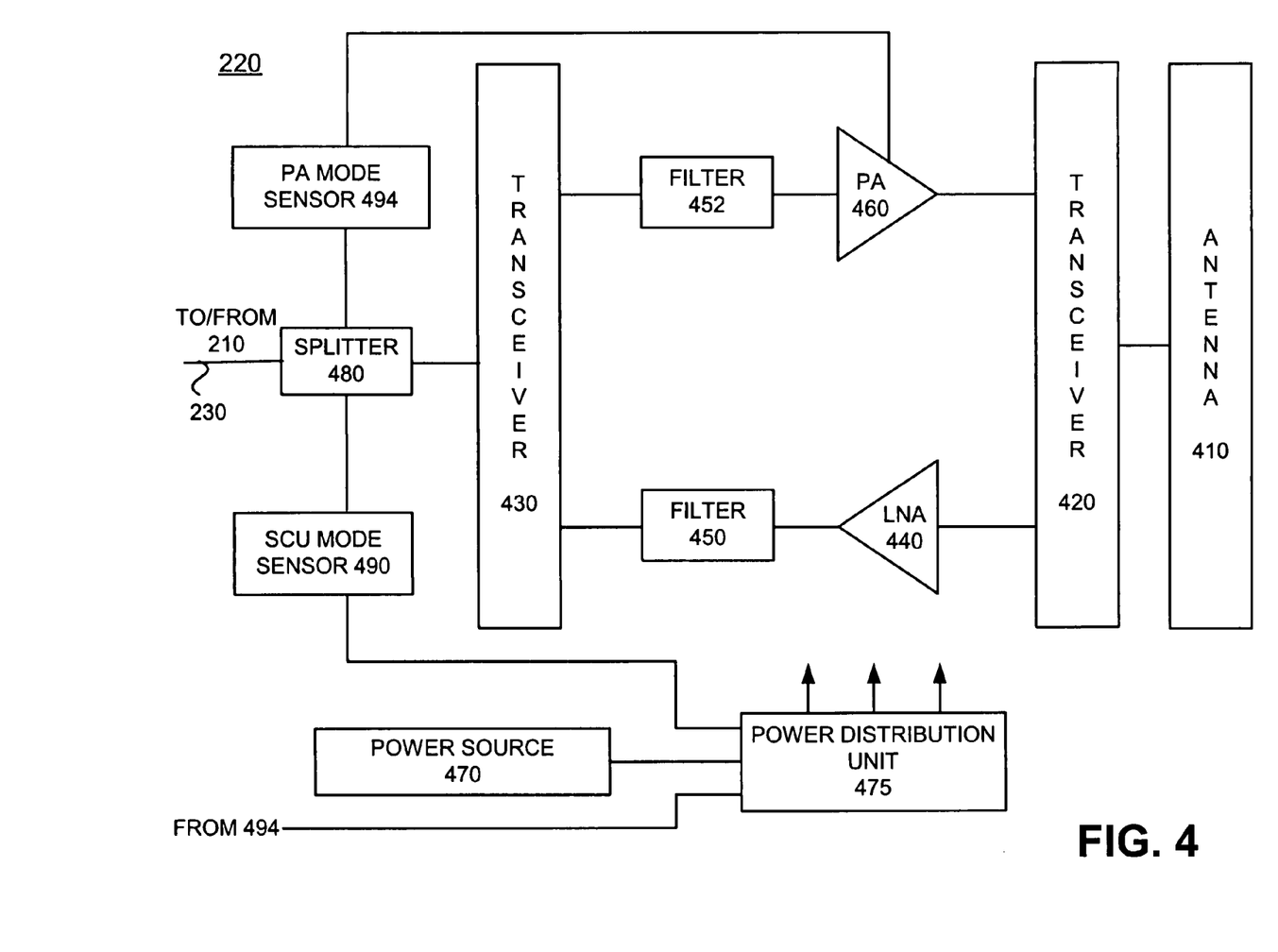
FIG. 4 is an exemplary diagram illustrating a portion of the satellite companion unit of FIG. 2

FIG. 4 illustrates an exemplary configuration of a portion of SCU 220 according to an exemplary implementation. Referring to FIG. 4, SCU 220 may includes antenna 410, transceivers 420 and 430, low noise amplifier (LNA) 440, filters 450 and 452, power amplifier (PA) 460, power source 470, power distribution unit 475, splitter 480, SCU mode sensor 490 and PA mode sensor 494. It should be understood that the configuration illustrated in FIG. 4 is provided for simplicity. It should also be understood that additional elements may be included in SCU 220 that aid in the reception and transmission of signals to, for example, satellite 140.

Antenna 410 receives and transmits RF signals from/to, for example, satellite 140. In one implementation, antenna 410 may receive RF signals in the L-band, S-band, or another band. Antenna 410 may forward received signals to transceiver 420, which forwards the signals to LNA 440. LNA 440 may amplify the received signals and forward amplified versions of the received signals to filter 450. Filter 450 may include a surface acoustic wave (SAW) band pass filter that filters the amplified signals. Filter 450 may then forward the filtered signals to transceiver 430, which forwards the filtered signals to splitter 480.

Splitter 480 may function to separate direct current (DC) signals from RF signals. In other words, splitter 480 may act as a high frequency/low frequency splitter. Splitter 480 may pass the RF and/or DC signals to handset 210 via cable 230. Splitter 480 may also receive signals from handset 210. Splitter 480 may forward DC signals to SCU mode sensor 490 and PA mode sensor 494 and RF signals to transceiver 420 with minimal signal attenuation. Based on the signals received from splitter 480, SCU mode sensor 490 may forward an SCU on/off indicator to power distribution unit 475. Splitter 480 may also send a DC signal to PA mode sensor 494, which may forward a PA on/off indication to PA 460. Transceiver 430 may receive RF signals from splitter 480 and forward the RF signals to filter 452. Filter 452 may include a SAW BPF that filters the received signals and forwards the filtered signals to PA 460. PA 460, when powered up, may amplify the filtered signals and forward the amplified signals to transceiver 420 for transmission via antenna 410. It should be understood that SCU 220 may include additional elements, such as modulators, de-modulators, interleavers, error correction logic, etc. Description of such elements is not provided herein in order to not unduly obscure the thrust of the invention.

Power source 470 may include one or more batteries that provide power to components of SCU 220. Power source 470 may be coupled to power distribution unit 475 that operates in conjunction with SCU mode sensor 490 and PA mode sensor 494 to control the power mode operation of SCU 220 to conserve battery power, as described in detail below.

Figure 5:
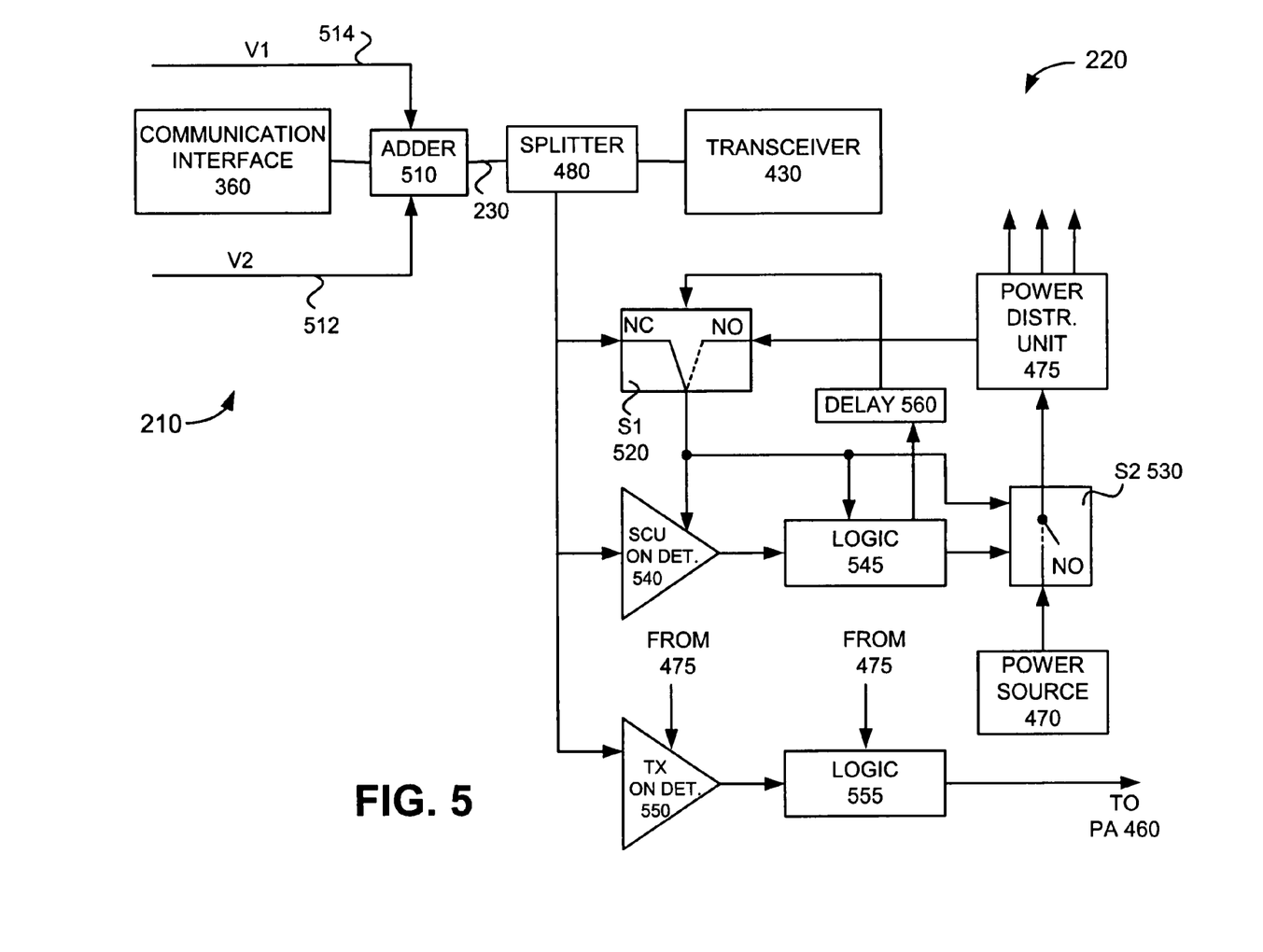
FIG. 5 is an exemplary diagram illustrating portions of the handset and satellite companion unit associated with power mode control.

FIG. 5 is a block diagram illustrating exemplary components of handset 210 and SCU 220 involved in power mode control of SCU 220. Referring to FIG. 5, the portion of handset 210 illustrated includes communication interface 360 and adder 510. Adder 510 may be a DC adder circuit that receives various DC signals on lines 512 and 514 based on the operational state of handset 210 and adds these signals. In one implementation, adder 510 may receive a steady state DC voltage via line 512, referred to herein as V2, when handset 210 is turned on. Adder 510 may also receive a steady state DC voltage via line 514 (e.g., transmitter on signal), referred to herein as V1, when the transmitter portion of handset 210 is turned on/active, such as when handset 210 would like to transmit voice and/or data signals via, for example, satellite 140. These steady state DC voltages V1 and V2, as described in detail below, may be used to control the power mode operation of SCU 220. Adder 510 forwards the DC signals along with RF signals via cable 230 to SCU 220.

The portion of SCU 220 illustrated in FIG. 5 includes switch 1 (S1) 520, switch 2 (S2) 530, SCU on detector 540, logic 545, transmit on detector 550, logic 555, delay element 560, power source 470 and power distribution unit 475. SCU mode sensor 490 in FIG. 4 may include elements 540 and 545 and PA mode sensor 494 in FIG. 4 may include elements 550 and 555. S1 530 may be, for example, a normally closed, single pole double throw solid state switch that includes a normally closed (NC) contact and a normally open (NO) contact. S1 530 may receive power from power distribution unit 475, based on the state of S2 530. S1 530 may also receive a control input from logic 545 via delay element 560.

SCU on detector 540 may include a detector/comparator circuit that receives input from splitter 480 and S1 520. When SCU 220 is connected to handset 210, the input from splitter 480 may be a DC signal having the voltage V2. SCU on detector 540 may compare the two inputs (i.e., input from splitter 480 and input from S1 520) and output a control signal to logic 545. For example, when V2 is present, SCU on detector 540 may send a signal to logic 545 indicating that SCU 220 is connected to handset 210.

Logic 545 may receive the control signal from SCU on detector 540 and forward a control signal to S2 530. S2 530 may be, for example, a solid state single pole single throw switch that is normally open. When SCU on detector 540 detects V2, logic circuit 545 may signal S2 530 to close its normally open contact. As a result of the closing of S2 530, power from power source 470 may be fed to power distribution unit 475.

Transmit on detector 550 may include a detector/comparator circuit that receives input from splitter 480 and power distribution unit 475. When the transmitter portion of handset 210 is on and/or handset 210 is preparing to transmit data to, for example, satellite 140, the input from splitter 480 may be a DC signal having voltage V1+V2. Transmit on detector 550 may compare the two inputs (i.e., input from splitter 480 and input from power distribution unit 475) and output a control signal to logic 555.

Logic 555 may receive power from power distribution unit 475. When the transmitter on signal is detected, logic 555 receives this indication from transmit on detector 550 and outputs a control signal to PA 460 indicating that PA is to be powered up. Processing by components in mobile terminal 110, such as the components illustrated in FIGS. 4 and 5, with respect to controlling the power mode operation of SCU 200 will be described in more detail below.

Exemplary Processing

Figure 6:
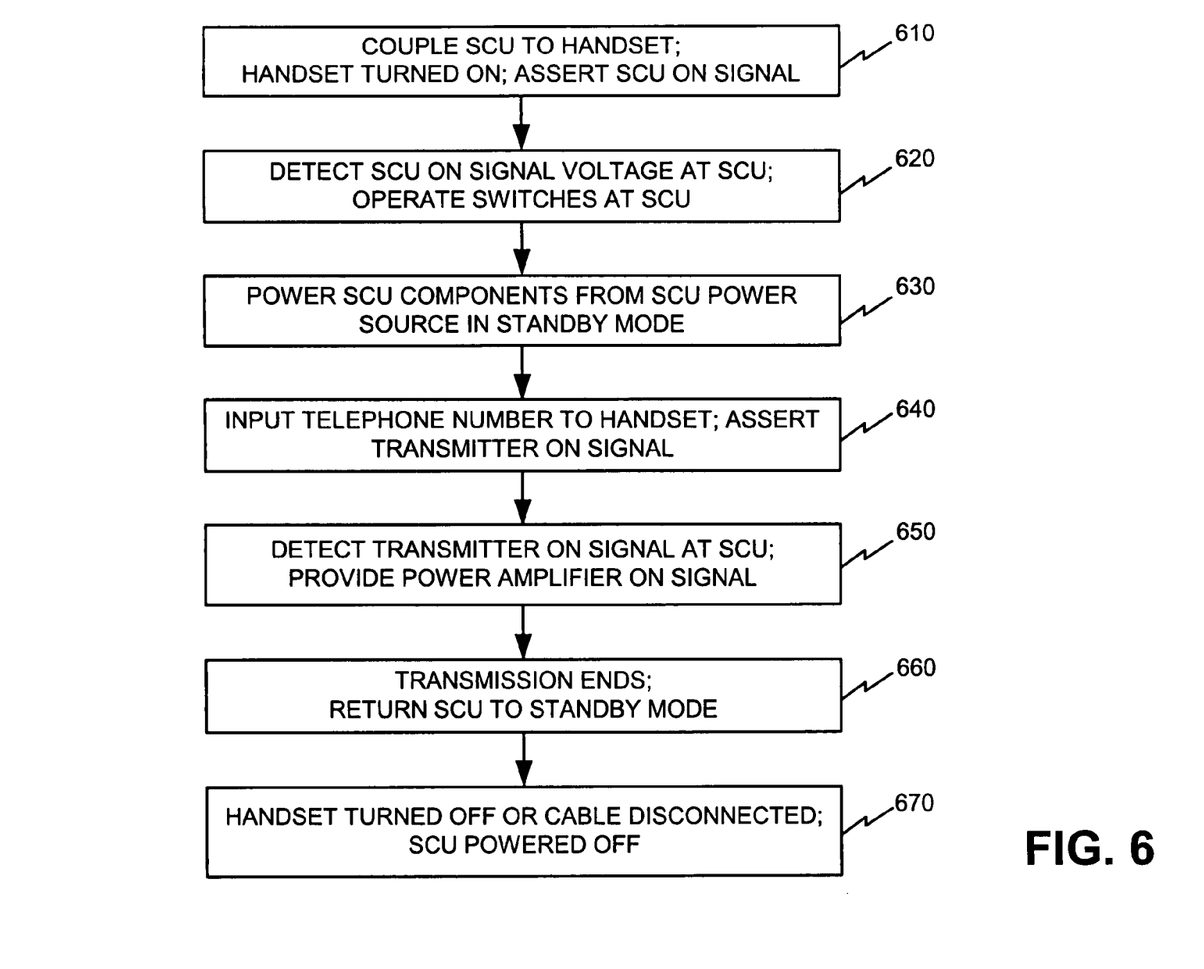
FIG. 6 is a flow diagram illustrating exemplary processing consistent with an exemplary implementation.

FIG. 6 illustrates exemplary processing with respect to controlling the power mode operation of SCU 220. Assume that the user of mobile terminal 110 wishes to use mobile terminal 110 in a mode associated with receiving and/or transmitting data via satellite 140. For example, assume that cellular service via terrestrial network 130 is not available or is not reliable. The user of mobile terminal 110 may couple SCU 220 to handset 210 (act 610). For example, as described previously, in one implementation, handset 210 may be coupled to SCU 220 via cable 230, which may be a wired connection, such as a coaxial cable. In this case, coaxial connectors may be included on handset 210 and SCU 220 that facilitate easy connection of cable 230 to handset 210. As also described above, in some implementations, the connection from cable 230 to SCU 220 may be a permanent or semi-permanent connection to ensure that cable 230 does not become lost. In each case, assume that the user couples cable 230 to handset 210 and, if necessary, to SCU 220, such that handset 210 and SCU 220 are coupled to each other.

Assume that handset 210 is turned on. When handset 210 is turned on, handset 210 may assert an "SCU ON" signal via line 512 (act 610). For example, when handset 210 is powered on, handset 210 may forward a DC voltage V2 on input line 512 to adder 510. This voltage V2 may function as an SCU ON signal. Adder 510 may forward this signal to splitter 480 via cable 230.

Splitter 480 may receive this signal, which may be included with RF signals, and extract the DC signal from any RF signals being transmitted via cable 230. Splitter 480 may forward the reference voltage V2 to SCU on detector 540 and transmit on detector 550. SCU on detector 540 may sense the presence of voltage V2 (act 620). The presence of voltage V2 indicates that SCU 220 was successfully connected to handset 210 and that handset 210 is turned "ON". Transmit on detector 550 may take no action based on reception of voltage V2 since transmit on detector 550 is configured to detect a transmitter on signal, as discussed in more detail below.

Upon detection of the voltage V2, SCU 220 switches S1 520 and S2 530 based on the determination that the SCU on signal was received (act 620). For example, referring to FIG. 5, SCU on detector 540 may forward a signal to logic 545 indicating that voltage V2 has been detected. Logic 545 may then switch the normally open contact S2 530 to the close position. Closing S2 530 effectively provides power from power source 470 to power distribution unit 475. Logic 545 may also switch the normally open contact at S1 520 to the close position and the normally closed contact at S1 520 to the open position. These control inputs may be forwarded from logic 545 to S1 520 via delay element 560. Delay element 560 may provide, for example, a delay of approximately 100 milliseconds and may prevent possible oscillations in certain transient situations. In other implementations, delay element 560 may not be needed.

As illustrated in FIG. 5, SCU on detector 540, logic 545, switch S1 520 and switch S2 530 are initially powered by voltage from handset 210 through the normally closed (NC) contact of S1 520. In an exemplary implementation, the switching of the normally open contact S2 530 upon detection of voltage V2 effectively powers SCU 220 in a standby mode (act 630). That is, the closing of S2 530 may provide power from power source 470 to power distribution unit 475, which may then supply power to a number of elements in SCU 220.

For example, upon detection of signal voltage V2, SCU 220 effectively switches out the source of power from handset 210 for elements 540, 545, 520 and 530 and switches in the source of power internal to SCU 220 (i.e., power source 470). SCU 220 may then operate in a "standby mode" with power distribution unit 475 providing power to, for example, LNA 440, filter 450, transceivers 420 and 430 (in addition to elements 520, 530, 540 and 545), but without powering up various elements associated with transmitting voice and/or data via satellite 140.

For example, in one implementation, in the SCU 220 standby mode, all the components illustrated in FIG. 4 may be supplied power from power distribution unit 475 and/or may be active with the exception of PA 460. In the standby mode, PA 460 may not be powered up or active. In the standby mode, SCU 220 may receive incoming telephone calls from satellite 140, but may not transmit signals to satellite 140. This may allow SCU 220 to conserve considerable power resources when in the standby mode since PA 460 is not powered up. In addition, powering SCU 220 in a standby mode in this manner allows SCU 220 to be powered up without the need for an on/off switch. That is, SCU 220 performs an automatic power up based on reception of the SCU on signal from handset 210. This helps simplify operation of SCU 220 by a user.

Assume that the user of mobile terminal 110 wants to make a call while SCU 220 in the standby mode. In this case, the user of mobile terminal 110 may dial a telephone number via input device 340 (act 640). Mobile terminal 110 may then send a "transmitter on" signal to adder 510 via line 514 (act 640). The transmitter on signal on line 514, as discussed previously, may have a predetermined voltage V1. Adder 510 combines the SCU on signal received via line 512 (having a voltage V2) with the transmitter on signal having a voltage V1 to create a combined signal having a voltage V1+V2.

Splitter 480 may extract this DC voltage from any RF signals being transmitted via cable 230 and forward the reference voltage V1+V2 to SCU on detector 540 and transmitter on detector 550. SCU on detector 540 may not react to this pulse since it is superimposed on DC voltage V2 and no further action may take place with respect to SCU on detector 540. Transmitter on detector 550, however, senses the reference voltage V1+V2 as corresponding to a transmitter on signal (act 650).

For example, transmit on detector 550 may compare the reference voltage V1+V2 to a reference voltage received from power distribution unit 475 and determine that handset 210 is ready to transmit. Transmit on detector 550 may then signal logic 555 to provide a "power amplifier on" signal to PA 460 (act 650).

PA 460 may then receive the power amplifier on signal and power up or activate PA 460. Once PA 460 is powered up and active, SCU 220 may forward the RF signals from handset 210 (i.e., voice and/or data signals) through transceiver 430 and filter 452 to PA 460. PA 460 may amplify the signals and forward the amplified signals to transceiver 420 for transmission via antenna 410. In this manner, SCU 220 may enter a transmission mode in which signals from handset 210 may be transmitted via SCU 220. The transmission mode may represent a full power mode for SCU 220 in which all components needed for reception and transmission, including PA 460, are powered and active. SCU 220 may stay in this full power mode as long as handset 210 stays in a transmit mode (e.g., is engaged in a voice telephone call, is engaged in transmitting data, such as text messages, or is engaged in other communications in which transmission is required).

Assume that the user of mobile terminal 110 terminates the transmission (act 660). For example, assume that the user presses a hang-up button on handset 210 to end a telephone call. When such an action occurs, handset 210 de-asserts the transmitter on signal on line 514. Adder 510 may now forward the DC signal with voltage V2 (i.e., the SCU on signal) to splitter 480, which forwards the signal V2 to transmit on detector 550.

Transmit on detector 550 senses the absence of voltage V1 and signals logic 555 that the transmitter on signal is no longer present. Logic 555 may then send a power amplifier off signal (or de-asserts the power transmitter on signal) to PA 460. PA 460 receives the power transmitter off signal (or de-assertion of the PA on signal) and powers off/down PA 460. SCU 220 may then re-enter a standby power mode (act 660). As discussed above, in the standby mode, SCU 220 may receive calls, but may not transmit to satellite 140.

SCU 220 may also include a self turn off feature. For example, assume that handset 210 is turned off or cable 230 is disconnected from handset 210. In this case, handset 210 de-asserts the reference voltage V2 on line 512. Splitter 480, as discussed above, forwards the DC component of the signal on cable 230 to SCU on detector 540. In this case, SCU on detector 540 senses the loss of the steady state DC voltage V2 and forwards a signal to logic 545. Logic 545 then switches normally open (NO) contact of S2 530 to open, thereby removing power from power source 470 to power distribution unit 475. In addition, S1 520 returns the normally closed (NC) contact to close and the normally open (NO) contact to open. Operation of S1 520 and S2 530, therefore, removes power from components in SCU 220 and SCU 220 enters a power off mode (act 670).

SCU 220, therefore, returns to an off mode and awaits a signal from handset 210 for future powering up. In this manner, SCU 220 may save power when not in use and/or is not needed.

Figure 7:
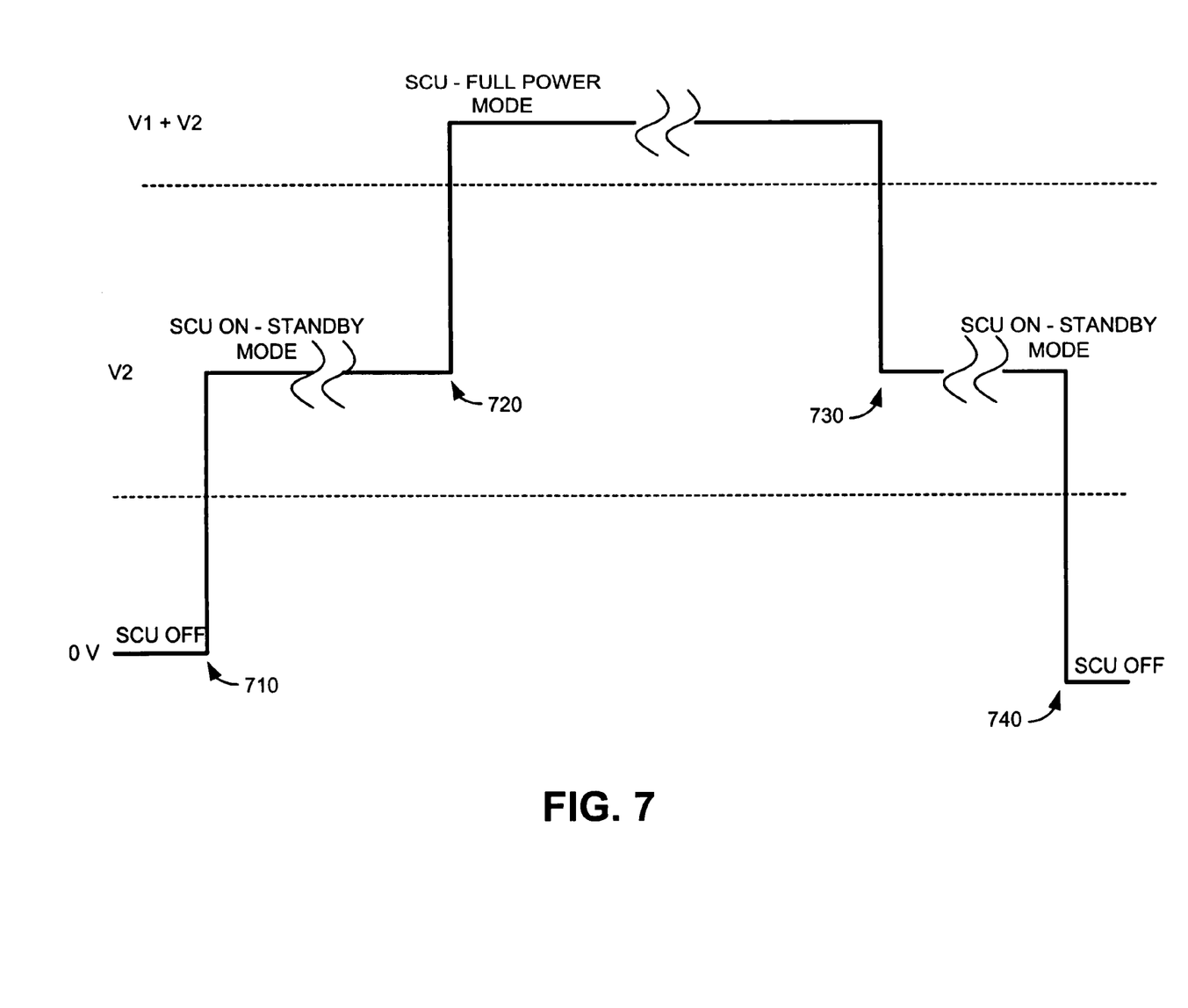
FIG. 7 is a schematic diagram illustrating power mode control operations associated with the handset and satellite companion unit.

FIG. 7 is a schematic diagram illustrating the transition of SCU from an SCU off mode to an SCU standby mode to an SCU full power mode. Referring to FIG. 7, SCU is initially in an off state. In this state, the voltage at SCU is zero volts and power source 470 is not being used. Such a state corresponds to handset 210 being turned off or cable 230 not being connected from handset 210 to SCU 220.

At point 710, handset 210 turns on with cable 230 connected to handset 210 or cable 230 may be connected to handset 210 with handset 210 turned on. At this point, voltage V2 is received at SCU 220 and SCU 220 enters a standby mode.

At point 720, handset 210 enters a transmission mode (e.g., the transmitter of handset 210 is active) and voltage V1+V2 is received by splitter 480. As described above with respect to act 650, SCU 220 may then enter a full power mode with PA 460 powered. At point 730, the transmission mode is terminated (e.g., the transmitter of handset 210 is no longer active), resulting in voltage V2 at splitter 480. SCU 220 may then re-enter the standby mode with PA 460 powered down.

At point 740, handset 210 may be turned off or cable 230 may be disconnected from handset 210. SCU 220 then enters a powered off state in which power source 470 is no longer powering components of SCU 220.

CONCLUSION

Systems and methods described herein provide for efficiently powering an SCU with little or no input from a user. This may allow the mobile terminal to conserve power and extend battery life with respect to communicating with a satellite-based network.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, implementations consistent with the invention have been described above with respect to use of a mobile terminal that includes a handset coupled to an SCU for use in hybrid network that utilizes a terrestrial network and a satellite/spaced-based network. It should be understood, however, that implementations consistent with the invention may be used in other types of networks and are not limited to any particular type of network.

In addition, implementations described above refer to a handset and an SCU as being implemented in separate devices. It should also be understood that in some implementations, the functions of the handset and SCU may be included in a single device.

It will also be apparent to one of ordinary skill in the art that aspects of the invention, as described above, may be implemented in different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, microprocessor, application specific integrated circuit (ASIC) or a field programmable gate array (FPGA), software, or a combination of hardware and software.

Lastly, while series of acts have been described with respect to FIG. 6, the order of the acts may be modified in other implementations consistent with the present invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for powering a satellite communication device that communicates with a satellite, comprising:
   receiving a first power mode control signal having a first voltage when a handset is turned on and is coupled to the satellite communication device;
   operating the satellite communication device in a first power mode in response to the first power mode control signal received by the satellite communication device, the first power mode representing a standby mode in which the satellite communication device is configured to receive signals from the satellite;
   operating the satellite communication device in a second power mode in response to a second power mode control signal received by the satellite communication device when the handset is in a transmission mode associated with transmitting signals to the satellite, the second power mode representing a full power mode; and
   maintaining the satellite communication device in the first power mode when the transmission mode is terminated.

2. The method of claim 1, further comprising:
   powering down the satellite communication device when the handset is turned off or when the satellite communication device is disconnected from the handset.

3. The method of claim 1, wherein operating the satellite communication device in the first power mode comprises:
   providing power from a power source located within the satellite communication device to a first plurality of components within the satellite communication device.

4. The method of claim 3, wherein operating the satellite communication device in the second power mode comprises:
activating a power amplifier associated with transmitting signals to the satellite.

5. The method of claim 1, further comprising:
determining that the handset is coupled to the satellite communication device and that the handset is turned on in response to receiving the first power mode control signal, wherein operating the device in a first power mode comprises:
connecting a power source located within the satellite communication device to a plurality of components within the satellite communication device in response to receiving the first power mode control signal.

6. The method of claim 5, further comprising:
receiving a second signal having a second voltage when the handset is coupled to the satellite communication device, the second signal corresponding to the second power mode control signal; and
determining that the handset is in the transmission mode in response to receiving the second signal, wherein operating the satellite communication device in a second power mode comprises:
activating at least a first component located within the satellite communication device, the first component being associated with transmitting signals to the satellite.

7. The method of claim 6, wherein the activating at least a first component comprises powering up a power amplifier.

8. The method of claim 1, further comprising:
transmitting voice or data signals to the satellite when the satellite communication device is in the second power mode; and
receiving voice or data signals from the satellite when the satellite communication device is in the second power mode.

9. A system, comprising:
a radiotelephone device configured to transmit and receive radio frequency signals via a terrestrial-based network; and
a satellite communication device directly coupled to the radiotelephone device via a wired connection, wherein the radiotelephone device is configured to:
transmit a first power mode control signal to the satellite communication device when the radiotelephone device is powered up and the satellite communication device is coupled to the radiotelephone device via the wired connection, and
transmit a second power mode control signal to the satellite communication device via the wired connection, when the radiotelephone device is in a transmission mode, wherein the satellite communication device is configured to:
transmit and receive radio frequency signals via a satellite-based network,
receive the first power mode control signal from the radiotelephone device via the wired connection, and
provide power to components of the satellite communication device from a power source located within the satellite communication device based on the first and second power mode control signals, wherein the providing power comprises:
providing power to a first portion of components associated with receiving signals from a satellite in response to receiving the first power mode control signal, and
providing power to a second portion of components associated with transmitting and receiving signals from the satellite in response to receiving the second power mode signal.

10. The system of claim 9, wherein providing power to the second portion of components comprises:
providing power from the power source to at least one component not included in the first plurality of components.

11. The system of claim 9, wherein providing power to components of the satellite communication device comprises:
operating the satellite communication device in a first power mode when the radiotelephone device is turned on and the satellite communication device is coupled to the radiotelephone device via the wired connection, and
operating the satellite communication device in a second power mode when the radiotelephone device is in a transmission mode and the satellite communication device is coupled to the radiotelephone device via the wired connection.

12. The system of claim 9, wherein the first portion of components is a subset of the second portion of components.

13. The system of claim 9, wherein the
first signal has a first voltage and
the second signal has a second voltage.

14. The system of claim 13, wherein the first and second voltages are different.

15. The system of claim 13, wherein the satellite communication device is further configured to:
receive the first power mode control signal, and
operate the satellite communication device in a first power mode in response to receiving the first power mode control signal, the first power mode representing less than a full power mode.

16. The system of claim 15, wherein the satellite communication device is further configured to:
receive the second power mode control signal, and
operating the satellite communication device in a second power mode in response to receiving the second power mode control signal, the second power mode representing the full power mode.

17. A communication device, comprising:
a power source;
a transmitter configured to transmit radio frequency signals to a satellite via a satellite-based network;
a receiver configured to receive radio frequency signals from the satellite via the satellite-based network; and
logic configured to:
receive power mode control information from a handset coupled to the communication device via a wired connection, and
provide power to components of the communication device from the power source based on the power mode control information.

18. The communication device of claim 17, further comprising:
a coaxial connector for receiving a coaxial cable that couples the communication device to the handset, the coaxial cable corresponding to the wired connection.

19. The communication device of claim 17, wherein when receiving power mode control information, the logic is configured to:
receive a first signal when the communication device is coupled to the handset via the wired connection and the handset is turned on, and receive a second signal when the handset is in a transmission mode.

20. The communication device of claim 19, wherein the first signal has a first voltage and the second signal has a second voltage, the first and second voltages being different.

21. The communication device of claim 20, further comprising:
   a first detector configured to receive the first voltage and identify the first voltage as corresponding to a power on signal for the communication device, and
   a second detector configured to receive the second voltage and identify the second voltage as corresponding to a full power signal for the communication device.

22. The communication device of claim 19, wherein when providing power to components of the communication device, the logic is configured to:
   operate the communication device in a first power mode in response to receiving the first signal, the first power mode representing less than a full power mode.

23. The communication device of claim 22, wherein when providing power to components of the communication device, the logic is further configured to:
   operate the communication device in a second power mode in response to receiving the second signal via the wired connection, the second power mode representing the full power mode.

24. The communication device of claim 23, wherein when operating in the first power mode, the communication device is configured to receive signals from the satellite and when operating in the second power mode, the communication device is configured to transmit and receive signals from the satellite.

25. A communication device, comprising:
   first means for:
      transmitting and receiving radio frequency signals via a terrestrial-based network, and
      transmitting power mode control information; and
   second means, directly coupled to the first means via a wired connection, for:
      transmitting and receiving radio frequency signals via a satellite-based network,
      receiving the power mode control information from the first means via the wired connection, and
      providing power to components of the second means from a power source located within the second means based on the power mode control information.

* * * * *